United States Patent Office 3,400,614
Patented Sept. 10, 1968

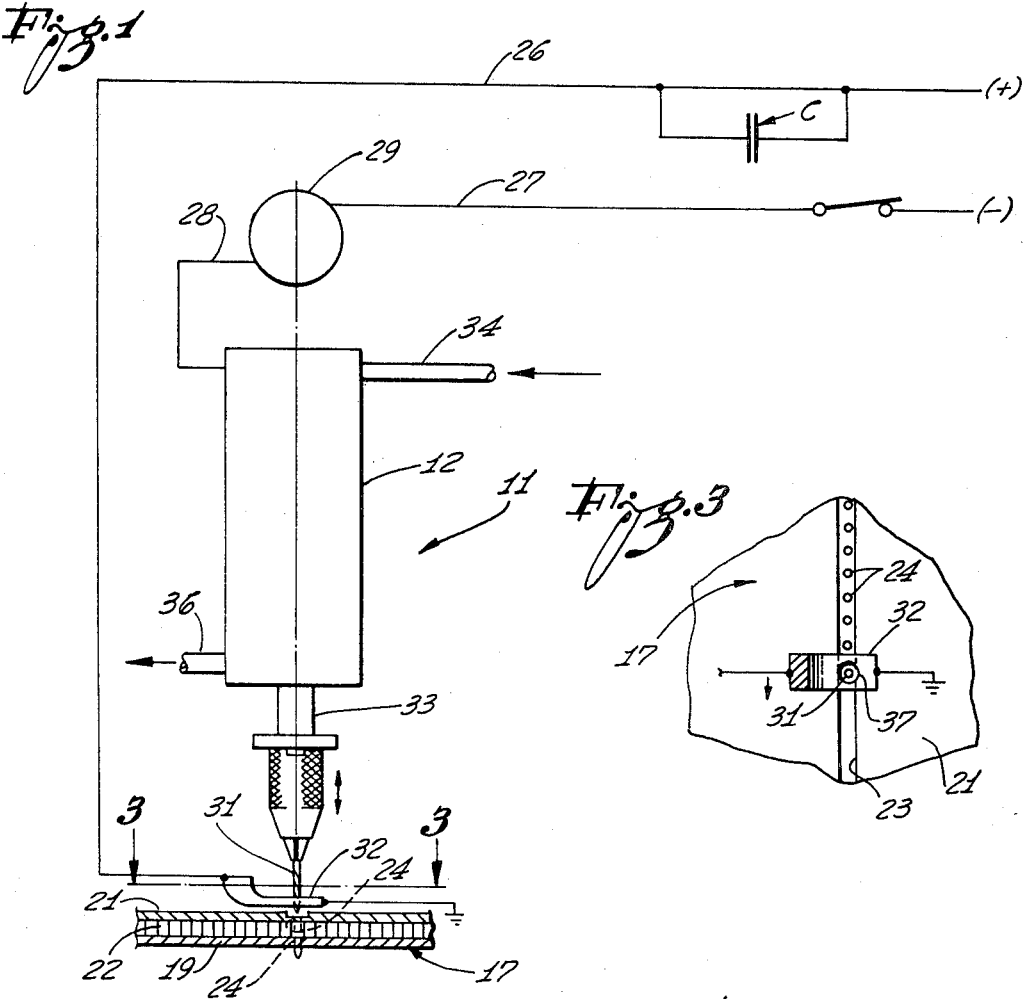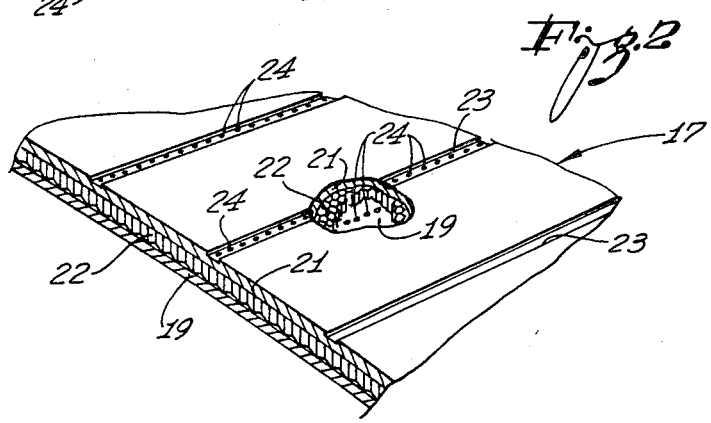

3,400,614
SURVEILLANCE SYSTEM
Edwin A. de Voss, Torrance, Calif., assignor to Northrop Corporation, Beverly Hills, Calif., a corporation of California
Original application May 4, 1964, Ser. No. 364,579, now Patent No. 3,285,102, dated Nov. 15, 1966. Divided and this application July 27, 1966, Ser. No. 568,176
3 Claims. (Cl. 77—5)

The present invention relates to apparatus for effecting a machining operation and more particularly to an assembly for drilling a plurality of holes in a structure that embodies a surveillance feature enabling the assembly to detect drill breakage should the same occur during a drilling operation performed on the assembly.

The present application constitutes a division of our copending application of Ser. No. 364,579 filed May 4, 1964, now Patent No. 3,285,102, and entitled, Drilling Assembly.

Briefly the present surveillance system embodies an electric circuit including components of a drilling assembly. The drilling assembly includes a drill bit normally operating in an aperture provided in the foot member of the above mentioned assembly. Should drill breakage occur during a drilling operation, whereby the drill bit no longer operates in the aperture in the foot member, the aforementioned electric circuit is no longer effective to supply current to the electric motor of the assembly. Accordingly all operations of the assembly are discontinued and remain so until the broken drill bit is replaced.

Accordingly the prime objective of the present invention is to disclose apparatus including a drilling assembly incorporating a drill breakage surveillance feature adapted to automatically detect drill breakage that may occur during a drilling operation.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 constitutes a schematic showing of the surveillance system as disclosed herein.

FIGURE 2 is a perspective view of a panel assembly fabricated in part by the equipment shown in FIGURE 1.

FIGURE 3 is a sectional view taken on the line 3—3 of FIGURE 1.

Referring to the drawing and particularly to FIGURE 1, this figure shows the surveillance apparatus as disclosed herein indicated generally by the numeral 11. The apparatus 11 is utilized with a drill unit 12 mounted and functioning substantially as shown and described in my copending application referred to above.

For purposes of illustration it is assumed the unit 12 is utilized to drill a plurality of apertures in an aircraft panel assembly 17. The assembly 17 incorporates means for removing boundary layer air from the surface of an aircraft.

Referring to FIGURE 2, the construction of the assembly 17 is briefly described. The construction of the assembly 17 constitutes no part of the present invention and is merely described to provide back ground information and a better understanding of why a drill bit breakage surveillance system is required.

Referring to FIGURE 2, the assembly 17 includes inner and outer skin members 19 and 21, respectively, having honeycomb core material 22 bonded therebetween. Epoxy glue or other adhesive material, normally harder than the material from which the members 19 and 21 and the material 22 is fabricated, is utilized in effecting the bond between the material 22 and the members 19 and 21. Machined in the outer skin member 21 is a plurality of grooves 23 extending longitudinally of the assembly 17, the grooves 23 opening on the outer surface of the skin member 21. A multitude of accurately spaced apertures 24, provided centrally of and in straight line configuration in the grooves 23, extend through the members 19, 21 and material 22. The construction of the panel 17 is completed after the grooves 23 and holes 24 are fabricated therein by covering the member 21 with a thin sheet member (not shown) constituting the external skin of the panel 17. Extremely narrow slits (not shown), coextensive with each of the center lines of the slots 23, are provided in the aforementioned external skin member, the slits and apertures 24 function to allow ingress of boundary layer air to passages (not shown) provided internally of the aircraft of which the assembly 17 constitutes a part.

Due to various factors present and encountered during the drilling of the apertures 24 in the assembly 17; viz., improper support of the drill bit, differences in hardness between the parts comprising the assembly 17 and the rapidity at which the apertures 24 must be drilled if an excessive amount of time is not to be consumed, the importance and desirability of a drill bit surveillance feature becomes apparent. The incorporation of a surveillance feature 11 relieves the operator of the responsibility of watching for drill breakage occurring during drilling operations of the drill unit, in other words his time is made available for other and more urgent duties.

The unit 12 is mounted on track means (not shown) similarly as shown and described in our copending application, Ser. No. 364,579 filed May 4, 1964, insures that the apertures will be spaced as desired and positioned in a straight line coinciding with the longitudinal center line of the grooves 23. Referring to FIGURE 1, it will be seen that the surveillance apparatus defines an electric circuit including connectors 26, 27 and 28, electric motor 29, drill unit 12 (including the drill bit 31) and the foot member 32. Rotary movement is imparted to the unit 12 by the motor 29 while reciprocal movement is imparted to the drill spindle 33 and bit 32 by compressed air ported to and from the chamber of the unit 12 through the conduits 34 and 36. It will be understood that the unit 12 is advanced on the aforementioned track means each time an aperture 24 is drilled, reciprocating movement being imparted to the spindle and drill bit 31 by any of various conventional means for example, the mechanism as shown in our copending application referred to above.

Normally the drill bit 32 operates in an aperture 37 provided in the foot member 32 substantially as the needle of a sewing machine operates in an aperture or slit provided in foot member of a sewing machine. The diameter of the aperture 37 is only slightly larger than the diameter of the bit 31, in fact the clearance provided between these two members insures a continuous flow of electricity under normal conditions between the bit 31 and the member 32. Accordingly a flow of electricity is normally provided through the connectors 26, 27 and 28, motor 29, unit 12 and foot member 32 to ground.

The connector 26 has a condenser C connected therein in parallel. At such times as slight vibrations of the drill bit 31 may occur the condenser functions to maintain the flow of electricity through the circuit described above. Should the bit 31 become broken during a drilling operation for reasons described above the bit will no longer operate in the aperture 37 during the full up stroke of the unit 12, and the drilling operation will be automatically discontinued until the bit 31 is replaced.

Thus it will be seen that a drill bit surveillance system is disclosed functioning to effect the prime object of the invention. While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

I claim:

1. In a drilling assembly incorporating means to detect drill breakage that may occur during a drilling operation, the combination comprising: a drilling unit including a motor and bit member; a guide member having an aperture formed therein; said bit member continuously operating in said aperture during normal operations of said unit; the clearance between said bit member and the walls defining said aperture being such that electrical contact is normally provided therebetween; and a path for electrical current including said bit member, guide member and motor connected in series whereby said motor will be deenergized in the event of bit member breakage.

2. In a drill assembly incorporating a feature adapted to detect drill breakage that may occur during the drilling of a multiplicity of holes and functioning to halt drilling operations, the combination comprising: a drilling unit including an electrical motor and drill bit; a foot member having an aperture therein; said drill bit continuously operating in said aperture in said foot member during normal drilling operations of said drilling unit; the clearance between said drill bit and the walls of said foot member defining said aperture permitting the flow of electric current therebetween; and an electrical circuit including primary and secondary circuits; said secondary circuit including said drill bit, foot member and motor connected in series whereby said motor will be deenergized in the event of bit breakage.

3. In a drilling assembly as set forth in claim 2: in which said secondary circuit has a parallel relation with respect to said primary circuit; and said secondary circuit including a condenser functions to provide continuous current flow in said primary circuit at such times as short interruptions in electrical contact occur between said foot member and drill bit.

References Cited

UNITED STATES PATENTS 3,301,100   1/1967   Hubeny _____ 77—5.2

FRANCIS S. HUSAR, *Primary Examiner.*